United States Patent [19]
McKenney

[11] 3,722,570
[45] Mar. 27, 1973

[54] TIRE CHANGER

[75] Inventor: John D. McKenney, South Laguna, Calif.

[73] Assignee: Royal Industries, Inc., Pasadena, Calif.

[22] Filed: Mar. 10, 1971

[21] Appl. No.: 122,983

[52] U.S. Cl..................................157/1.28, 157/1.17
[51] Int. Cl..................................................B60c 25/06
[58] Field of Search............157/1.17, 1.2, 1.22, 1.24, 157/1.26, 1.28

[56] References Cited

UNITED STATES PATENTS

| | | | |
|---|---|---|---|
| 3,064,718 | 11/1962 | Brosene, Jr. | 157/1.28 |
| 2,556,024 | 6/1951 | Bourdon et al. | 157/1.24 |
| 3,244,218 | 4/1966 | Rexroat | 157/1.22 X |
| 3,358,730 | 12/1967 | Mandelko | 157/1.17 |
| 3,522,832 | 8/1970 | Held | 157/1.22 |

*Primary Examiner*—Granville Y. Caster, Jr.
*Attorney*—Christie, Parker & Hale

[57] ABSTRACT

A tire changer having fixed bead breakers arranged to be operative on opposite faces of the same half of a wheel to effect the squeezing action for bead breaking in the fashion of ice tongs. One of the bead breakers is automatically actuated and the other bead breaker is adapted to be manually positioned adjacent the wheel rim and the tire to slide therebetween in response to the movement of the automatically actuated bead breaker. Chucking means is provided for automatically positioning and holding inflated tires of varying sizes on the tire changer in proper relationship with the bead breakers without resorting to any manual adjustments to accommodate tires of different sizes. The chucking means includes a movable wheel chuck adapted to be positioned in unison with the conventional rotary motor to position the rotor shaft in the center of the wheel. The rotary motor accommodates a tire tool for effecting the disengagement of the tire around the complete outer periphery of the wheel.

7 Claims, 7 Drawing Figures

INVENTOR.
JOHN D. McKENNEY
BY
Christie, Parker, & Hale
ATTORNEYS

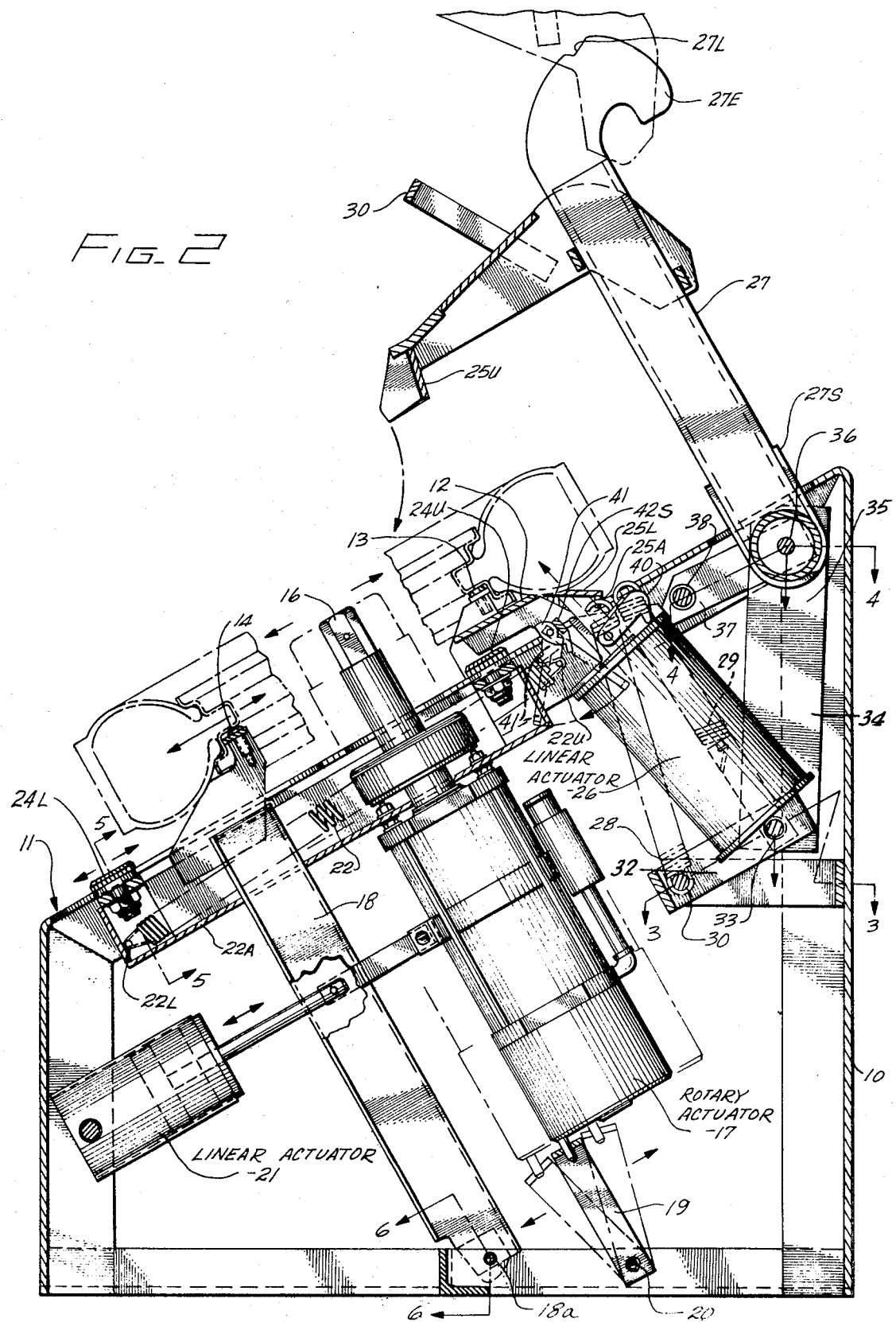

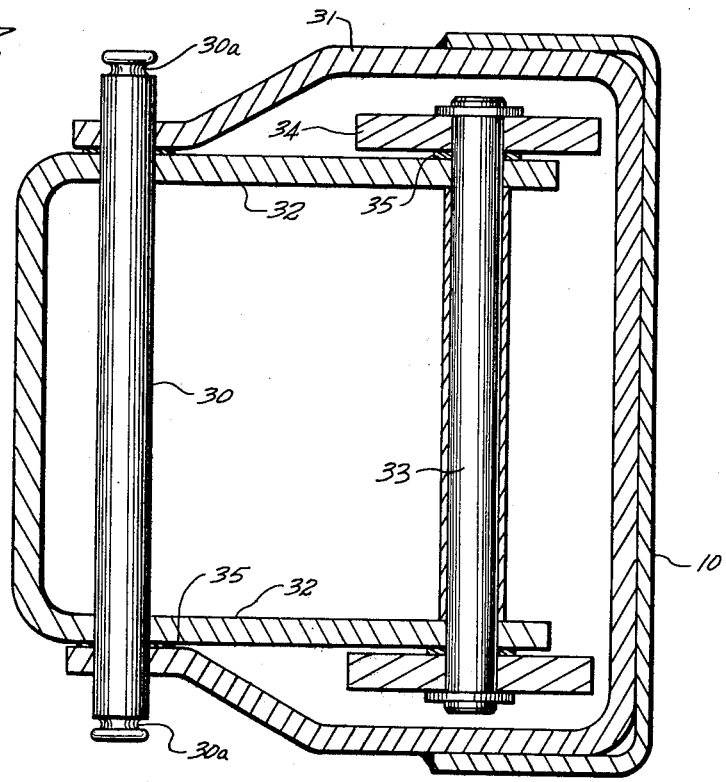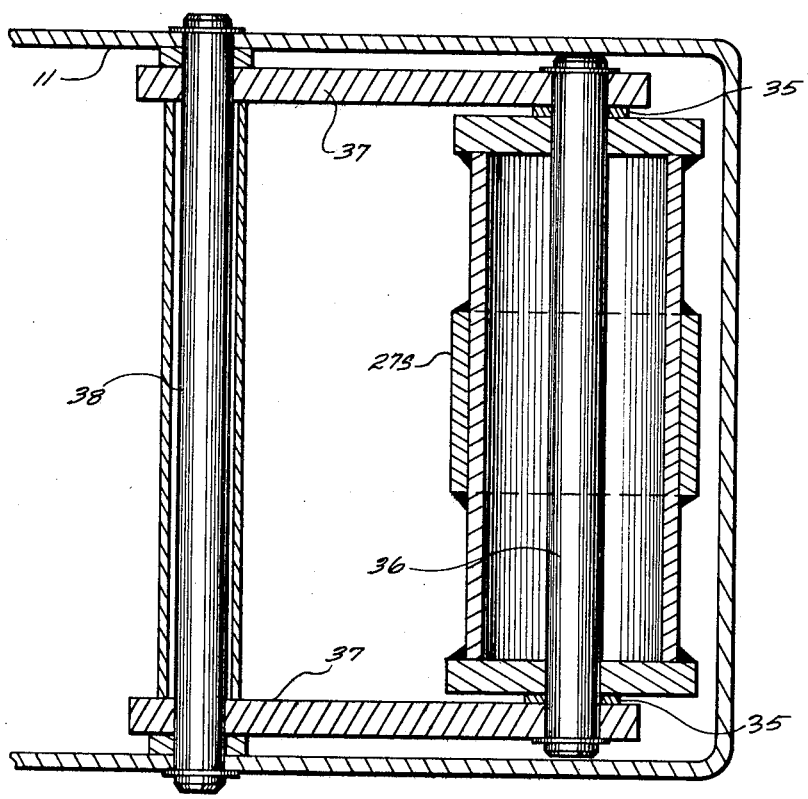

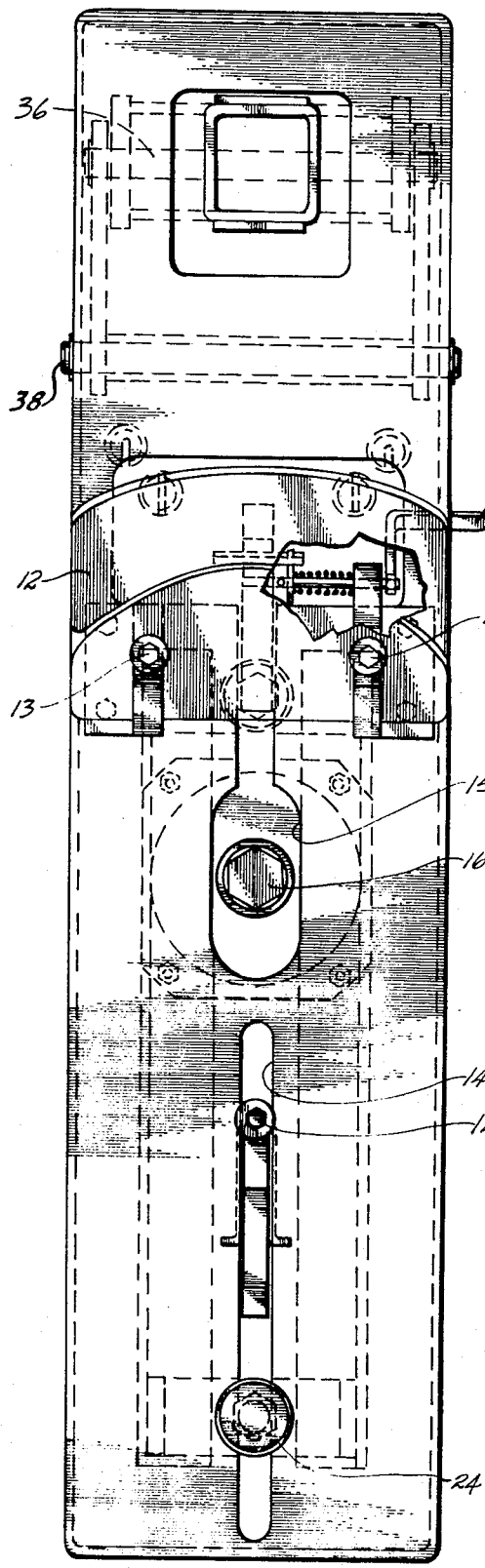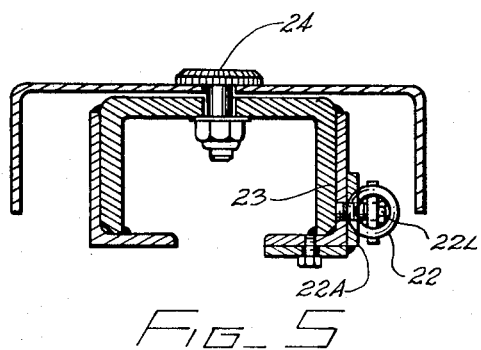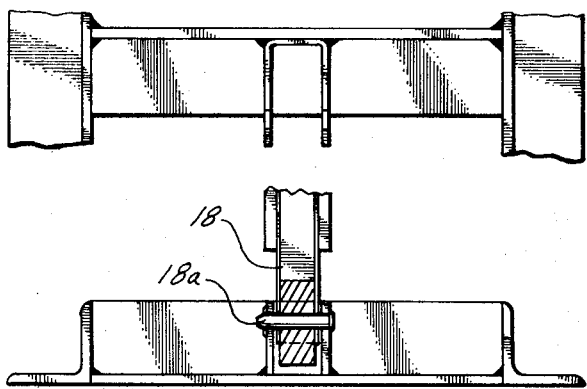

TIRE CHANGER

This invention relates to a tire changer.

At the present time there are available tire changers for breaking the beads of a deflated tire to allow the deflated tire to be removed from its wheel. The tire changers that are presently commercially available all have varying designs. In general, the tire changers that are commercially available require that the operator usually make a number of manual adjustments to accommodate the various wheel sizes and tires that are presently employed on motor vehicles. These adjustments include the manual adjustment of the bead breaking tools that are employed on these machines to properly effect the bead breaking operation. In addition, all presently known tire changing machines fix the center of the wheel with respect to the machine. All of these manual adjustments require additional time to effect the bead breaking operations and add to the overall time and effort required in changing tires. Accordingly, there is a need at the present time for a tire changer in which the number of manual adjustments for changing a tire is minimized and the amount of time for changing the tire is substantially reduced.

The present invention provides an improved tire changer that includes fixed position bead breakers that are employed along with chucking means for automatically positioning and holding the inflated tires of varying sizes on the machine in proper relationship with the bead breakers without any manual adjustments to accommodate tires of different sizes. The machine is defined so that the rotary motor conventionally employed with tire changing machines for accommodating a tire tool may be automatically positioned in unison with the positioning of a movable wheel chuck to secure wheels of varying diameters and to position the rotary spindle of the motor in the center of the wheel. The machine of the present invention, then, affords a simple and convenient means for mounting and holding the tire in a demounting position through the actuation of simple control devices in order that the tire may be properly positioned and held on the machine to thereby allow the bead breaking operation to be effected. One of the bead breakers is adapted to be manually positioned adjacent the wheel rim and the tire to slide therebetween in combination with and in response to the movement of the automatically actuated bead breaker to effect the bead breaking operation. The two fixed bead breakers are arranged to be operative on the same half of a wheel but on opposite faces to effect the squeezing action for bead breaking in the fashion of ice tongs. Once the initial bead is broken, then a conventional tire tool can be mounted to the rotary shaft to effect the disengagement of the tire around the complete outer periphery of the wheel. These and other features of the present invention may be more fully appreciated when considered in the light of the following specification and drawings, in which:

FIG. 2 is a side elevational view, with portions illustrated in dotted outline including an inflated tire positioned thereon, of the machine of FIG. 1;

FIG. 3 is a cross-sectional view taken along the line 3—3 of FIG. 2;

FIG. 4 is a cross-sectional view taken along the line 4—4 of FIG. 2;

FIG. 5 is a cross-sectional view taken along the lines 5—5 of FIG. 2;

FIG. 6 is a cross-sectional view taken along the line 6—6 of FIG. 2; and

FIG. 7 is a top plan view of the machine as illustrated in FIG. 2 without the tire positioned thereon.

Figure 1:
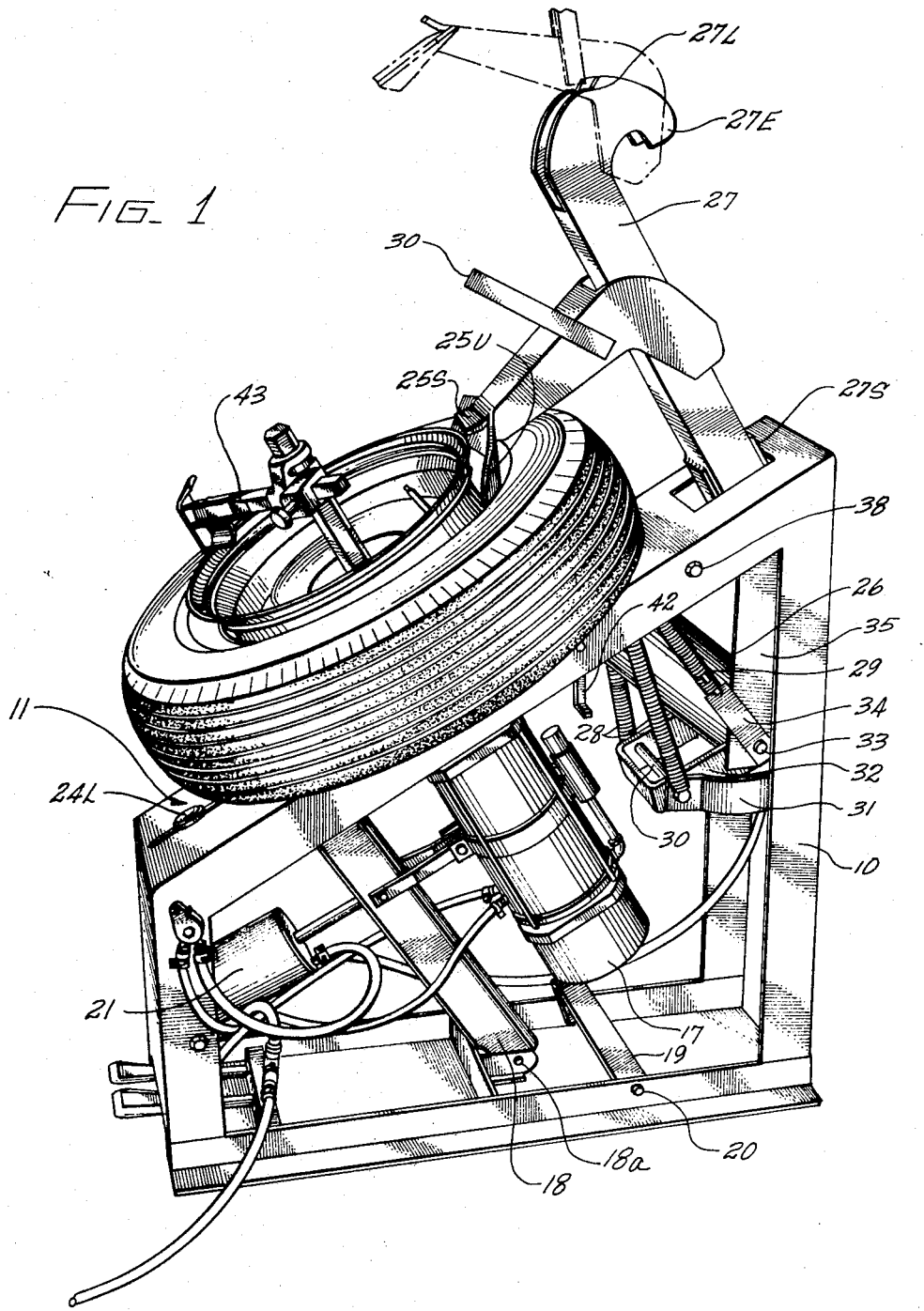
FIG. 1 is a perspective view of the tire changer of the present invention, with the side panels of the machine removed, and illustrating a deflated tire and wheel positioned in the machine.

Now referring to the drawings, the details of the tire changer of the present invention will be described. The machine is constructed of an upstanding U-shaped frame 10 defining an inclined tire mounting platform 11 for receiving an inflated tire. It will be recognized that the frame 10, as illustrated in the drawings, has the side panels removed that normally enclose the interior of the frame 10. The tire mounting platform 11 is generally defined on the uppermost surface of the U-shaped frame 10 and is arranged at an incline to allow greater convenience to the operator in positioning an inflated tire on the platform 11. The angle of incline for the platform 11 may be approximately 30 degrees. The tire mounting platform 11 is provided with a wheel support assembly 12 mounting a pair of spaced-apart fixed wheel chucks 13 for holding the rim of a wheel mounted thereon. The wheel chucks 13 are spaced apart on the wheel support assembly 12 and which spacing is arcuately defined to accommodate the lips of wheels of varying diameters as may be best appreciated from examining FIG. 2. The wheel support assembly 12 is mounted a predetermined distance above the mounting platform 11 proper.

A third movable wheel chuck 14 is mounted on the tire mounting platform 11 so as to be on the opposite side of the wheel center from the chucks 13. The third chuck 14 is positioned near the bottom of the incline or tire mounting platform 11 and in the same plane as the chucks 13. The chuck 14 projects through an aperture 14$^a$ provided thereon for guiding the chuck 14 along the incline. Spaced intermediate the chucks 13 and 14 is an oblong opening 15 for receiving the end of a shaft 16 extending upwardly therefrom. The exposed end of the shaft 16 is illustrated in a hexagonal form or a "hex." As will be more evident hereinafter the exposed end of the shaft 16 is coupled to be rotated by a rotary actuator 17 mounted below the mounting platform 11. In the same fashion, the mounting chuck 14 is mounted with a supporting arm 18 arranged centrally of the frame 10 and pivoted to the shaft 18$^a$. The rotary actuator 17 is guided by a pivoted inverted V-supporting structure 19 pivotally connected to the bottom members of the frame 10 by the pivot bolts 20. The movable chuck 14 and the rotary shaft 16 are illustrated in their normal at rest positions in FIGS. 2 and 7. They are moved from this at rest position down the incline along their respective guideways or openings 14$^a$ and 15 through the provision of a linear actuator 21. The linear actuator 21 is mounted to the front upstanding member of the frame 10 and is coupled to both the supporting arm 18 and the rotary actuator 17 intermediate their ends to cause them to move in unison. They are returned to their normal at rest positions through the provision of a tension return spring 22. The tension spring 22 is secured at one end by means of a bolt 22L secured to the yoke 23 which is movably secured to the mounting platform 11 by means of a fastener or tee bolt 24L as best illustrated in FIG. 5. An actuator carrier 22A is also secured to the yoke 23 and extends upwardly and underneath the platform 11 where it is secured by a tee bolt 24U. The tee bolt 24U is secured to the platform 11 immediately below the wheel support assembly 12. As best illustrated in FIG. 2, the rotary actuator 17 is mounted to and supported by the carrier 22A. The upper end of the return spring 22 extends beyond the tee bolt 24U and is secured to the frame by a bolt 22U. It should be evident that with the release of the wheel chuck 14 the stored energy of the spring 22 will return the chuck 14 and shaft 16 to their normal at rest position as well as the tee bolt 24L, as illustrated in FIG. 7.

A lower bead breaker 25L is mounted immediately adjacent and above the wheel support assembly 12 on the mounting platform 11. The lower bead breaker 25L is automatically actuated through the provision of a linear actuator 26 that extends it between the wheel rim and the tire for breaking the tire bead. The linear actuator 26 is pivotally mounted to a supporting structure which also supports a column 27 mounting the upper bead breaking tool 25U that is normally held in an inoperative position, as illustrated in dotted outline in FIGS. 1 and 2. It should be recognized that the configuration of the blades for the bead breakers 25U and 25L are of a conventional configuration, arcuate in shape to slip around the wheel rim. The upper bead breaker 25U is movable along the column 27 and which column is provided with a pair of ears 27E having locking notches 27L defined thereon for securing and holding the bead breaker 25U in an at rest position. For this purpose the bead breaker 25U is provided with a handle 30 to allow it to be readily manipulated by an operator. It is important to note at this point that the column 27 is arranged to be perpendicular to the plane of the mounting platform 11 and thereby the plane of a tire mounted thereon. The fixed relationship between the wheel chucks 13 and the outer lip of the wheel rim allows the bead breakers 25U and 25L to be arranged in the initial, fixed positions described hereinabove and therefore eliminates the need for manual adjustment for tires of different diameters. Similarly, since the column 27 is arranged perpendicular to the plane of the wheel, wheels of varying widths can be accommodated on the tire changer of the present invention without any adjustments being required.

The supporting structure for the column 27 and the linear actuator 26 is arranged in the form of a parallelogram with two pairs of tension or extension springs 28 and 29 secured to the bead breaker 25L and the mounting platform 11, respectively. The springs 28 are mounted to the opposite ends of a shaft 30 at the undercut portions that are identified in FIG. 3 as the portions 30A. The shaft 30 is secured to the rear upstanding member of the frame 10 by means of a U-shaped member 31 welded thereto. The shaft 30 also mounts a yoke 32 extending inwardly thereof and carrying a shaft 33. Spring retaining arms 34 each have one end mounted to the opposite ends of the shaft 33 and secure one end of the individual springs 29 at their free ends; see FIG. 1. The other ends of the springs 29 are secured to the platform 11 adjacent the bead breaker 25L. The linear actuator or fluid cylinder 26 for the lower bead breaker is coupled to the shaft 33. A pair of vertical links 35 mounted to the shaft 33 adjacent opposite ends thereof are positioned between the yoke 32 and the arms 34. The opposite end of the vertical links 35 are mounted to a pivotable shaft 36. The column 27 is coupled to the shaft 36 by means of a strap 27S (See FIGS. 2 and 4) and movable therewith. The ends of the shaft 36 are secured to individual links 37 having their opposite ends fixed to a shaft 38. The shaft 38 is secured to the opposite sides of the flanges of the platform 11.

A parallelogram is defined by the shafts 30, 33, 36 and 38 are viewed in FIG. 2. The shafts 30 and 38 are secured to the frame and the shafts 33 and 36 being movable. When the linear actuator is operated to extend the lower bead breaker 25L, the springs 28 and 29 allow the bead breaker 25L to be first extended between the wheel rim and the tire. With the extension of breaker 25L, the shafts 33 and 36 pivot downwardly in response thereto thereby causing the upper bead breaker 25U to be urged between the upper rim and the tire, as indicated by the arrows in FIG. 2. With the continued extension of the lower bead breaker 25L sufficient force is applied to break the bead as a result of the action of the two breakers.

The upward travel of the lower bead breaker 25L is limited by a latch 40. Associated with the latch 40 is a latch deflector 41 having an operating arm 42 extending from one side of the flange for the platform 11; see FIGS. 1 and 7. The latch deflector 41 is provided to control the travel of the lower bead breaker 25L in accordance with the size of the wheel rims being operated on. For this purpose the deflector 41 carries a stop 42S. The deflector 41 is illustrated in FIG. 2 in position to allow maximum travel of the breaker 25L and which travel is desirable for wheels having wide rims. For wheels having narrow rims, the deflector 41 is manually moved to the alternate position illustrated in dotted outline or position 41, through the operation of the handle 42. The travel of breaker 25L is controlled as a result of the latch 40 swinging into engagement with the deflector 41 when positioned in the path of the latch 40. In the alternate position the latch 40 slides past the deflector 41. At this point it should be noted that the downward travel of the upper breaker 25U is limited by the provision of the stop member 25S integral with the breaker 25U. This action results from the interengagement of the stop 25S and the wheel rim.

It will also be recognized that the rotary actuator 17 may assume any conventional form. It is important that it includes a hydraulic damper to prevent the sudden action on the tool 43.

With the above structure in mind, the operation of the tire changing machine for breaking the beads can be best examined. It will be appreciated that in its at rest position the bead breaking tool will be arranged at the top of the column 27 and is secured at the ears 27E of the column 27. Also, at this time the wheel chuck 14 and the shaft 16 will be positioned in their upward extremity on the mounting platform 11. With this positioning of the elements of the machine then the inflated tire and the wheel may be mounted on the mounting platform 11. It will be recognized that the central opening of the wheel will be mounted around the shaft 16 and that the lower outer lip of the wheel will be positioned against the two upper wheel chucks 13. As is conventional in tire demounting machines, the tire is placed on the machine in an inflated condition and then deflated without breaking the beads in preparation for the bead breaking operation. With this positioning of the wheel on the platform 11 the actuator 21 may then be actuated to cause the chuck 14 to travel downward on the incline until it engages the lower inner lip of the wheel. At this time the shaft 16 will also travel downwardly in unison therewith and will be positioned substantially centrally of the wheel opening, as desired. With the positioning of the wheel in this fashion it will be maintained in position by means of the chucks 13 and 14 thereby allowing the bead breakers 25U and 25L to be placed in an operative position. For this purpose the manually controlled bead breaker 25U is removed from its normal at rest position and moved along the column 27 until it is placed between the upper outer lip of the wheel and the tire for disengaging the tire from the wheel. After this has occurred, the actuator 26 may be actuated to cause the lower bead breaker 25L to extend upwardly between the lower lip of the wheel to effect the bead breaking operation. As a result of the initial travel of the breaker 25L, the parallelogram defined hereinabove will cause the shafts 33 and 36 to be moved in a generally downward direction which then causes the manual bead breaker 25U to move inwardly between the wheel and the tire so as to cause the two bead breakers to move towards one another in an ice-tong fashion to effect the bead breaking action. After the upper and lower beads are broken, a conventional tire tool 43 may be coupled to the exposed end of the shaft 16 as illustrated in FIG. 1. The tool 43 is secured to the free end of the shaft 16 to extend above the plane of the wheel to allow it to be rotated around the upper lip of the wheel. Accordingly, with the actuation of the rotary actuator 17, the tire tool 43 will travel around the wheel and disengage the tire completely from the wheel allowing it to be readily removed therefrom. After this is completed, the tire tool 43 may be removed and the bead breaker 25U placed in its normal position on the column 27. With the removal of the wheel from the platform, then, the stored energy of the spring 22 will allow the chuck 14 and the shaft 16 to be returned to their normal position. In the same fashion the springs 28 and 29 will return the lower bead breaker 25L to its normal position at which time the shafts 33 and 36 will also assume their normal position as illustrated in FIG. 2.

What is claimed is:

1. A tire changer comprising a tire mounting platform for receiving and holding a tire mounted on a wheel, said platform including spaced apart wheel gripping means for engaging opposite faces of the wheel, one of the wheel gripping means is arranged in a fixed, preselected position on the mounting platform and the other wheel gripping means being spaced on the platform on the opposite side of the wheel centerline and movable towards and away from said centerline, means coupled to said other wheel gripping means for selectively moving same, means for mounting and storing a first bead breaking tool on one side of the tire mounting platform for allowing the bead breaking tool to be manually positioned at the wheel rim of a tire mounted thereon from its storage position on said means, a second bead breaking tool mounted on the opposite side of the tire mounting platform for allowing the tool to be positioned between the opposite side of the wheel and the tire for breaking the tire bead, means for moving the second bead breaking tool into bead breaking position, a rotary shaft movably mounted to the tire mounting platform, means coupled to the shaft for rotating the shaft, and means pivotably mounted to said platform for moving said rotating means and the shaft with respect to the centerline of a wheel mounted thereon.

2. A tire changer as defined in claim 1 wherein the means for mounting the first bead breaking tool is mounted to be movably responsive to the operation of the means for moving the second bead breaking tool to cause the tools to be urged toward one another between the wheel and the tire to effect the breaking of the tire bead when the first tool is positioned at the wheel rim.

3. A tire changer comprising a tire mounting platform for receiving a tire mounted on a wheel in a tire demounting position, said platform including a wheel support assembly having a pair of spaced apart wheel gripping chucks mounted in a preselected fixed position thereon, a third wheel gripping chuck movably mounted on the platform for gripping a wheel at a point spaced from the pair of chucks, means coupled to said third chuck for moving it into wheel gripping engagement with a wheel positioned on the support assembly and gripped by the pair of chucks, a column pivotally mounted to the platform and normally arranged to be perpendicular to the plane of a tire mounted on the tire mounting platform, a bead breaking tool movably mounted on the column to allow it to be positioned between the wheel rim and tire when mounted on the wheel support assembly, a bead breaking tool movably mounted on the tire mounting platform for positioning between the wheel rim and a tire, means coupled to the last-mentioned bead breaking tool and the column for causing the movement of the bead breaking tools towards one another for breaking the beads of a tire from its wheel rim, rotary actuating means having a rotatable shaft extending through a tire mounting platform, and means for coupling the rotary actuating means to said means for moving the third wheel gripping chuck to be moved in unison therewith.

4. A tire changer as defined in claim 3 wherein said bead breaking tools are mounted to be operable on opposite faces of the wheel and on the same side of the rotary shaft.

5. A tire changer as defined in claim 4 wherein the plane of the tire mounting platform is arranged at a preselected incline with the plane of the column being arranged substantially perpendicular thereto to facilitate the mounting of a tire on the mounting platform.

6. A tire changing device comprising an upstanding U-shaped frame having a tire mounting member interconnected with and arranged at an incline to the upstanding arms of the frame, a wheel support assembly mounting a pair of spaced apart wheel gripping chucks for gripping the flanges of a wheel mounted thereon, said support assembly is mounted to extend a preselected mounting distance above the tire mounting member, a first bead breaking tool movably mounted on the tire mounting member adjacent the wheel support assembly, means mounted on the frame and operative for extending the first bead breaking tool in a direction generally perpendicular to the plane of a tire mounted on the frame, a rotary actuator pivotally mounted to the frame and having a shaft extending outwardly of the tire mounting member adjacent the wheel support assembly, a third wheel gripping chuck means pivotally mounted to the frame and extending outwardly of the tire mounting member to be movable towards and away from the wheel support assembly, a linear actuator coupled to the chuck means and the rotary actuator for pivoting the two to move in unison in response to the operation of the actuator, an upstanding column pivotally mounted to the frame in a substantially perpendicular relationship to the plane of the tire mounted on the frame and extending above the tire mounting member a sufficient distance to allow an inflated tire and wheel to be freely mounted thereon, said column mounting a second movable bead breaking tool slidable along the column to allow the tool to be inserted between the wheel flange and the tire mounted on the tire mounting member, and means coupled to said second tool for causing the tool to be responsive to the operation of the first bead breaking tool to move towards one another for breaking the beads of a tire from its wheel rim when said second tool is positioned between the wheel flange and the tire.

7. A tire changing device as defined in claim 6 including means selectively operable for limiting the travel of the bead breaking tool mounted on the tire mounting member for controlling the upward travel of the tool in accordance with the size of the wheel rims for the tire mounted thereon.

* * * * *